United States Patent [19]
Simmons, II

[11] Patent Number: 5,092,748
[45] Date of Patent: Mar. 3, 1992

[54] FUEL METERING PUMP SYSTEM

[75] Inventor: Robert L. Simmons, II, Santee, Calif.

[73] Assignee: Ketema Aerospace & Electronics Division, El Cajon, Calif.

[21] Appl. No.: 578,777

[22] Filed: Sep. 6, 1990

[51] Int. Cl.$^5$ .............................................. F04B 17/00
[52] U.S. Cl. ............................... 417/423.1; 417/423.7; 417/366; 417/356
[58] Field of Search .................. 417/423.1, 423.7, 366, 417/356

[56] References Cited

U.S. PATENT DOCUMENTS

| | | | |
|---|---|---|---|
| 4,143,488 | 3/1979 | Ade et al. | 417/366 |
| 4,830,576 | 5/1989 | Patrick | 417/371 |

Primary Examiner—Richard A. Bertsch
Assistant Examiner—Alfred Basichas
Attorney, Agent, or Firm—Baker, Maxham, Jester & Meador

[57] ABSTRACT

A combination flow through pump and motor fluid pump delivery and metering system comprises a combination pump and motor housing defining a flow passage extending from and communicating from an inlet to an outlet, including a heat sink section comprising an elongated conduit in heat transfer contact with a mounting plate for electronic controls for absorbing heat therefrom, a pump section defined by an eccentric rotor positive displacement pump having an inlet and an outlet, and a motor section including a brushless D.C. motor coaxially disposed and directly coupled to the eccentric rotor, the motor having a tubular rotor through which a fluid flows and a stator exterior of the housing.

23 Claims, 3 Drawing Sheets

FUEL METERING PUMP SYSTEM

BACKGROUND OF THE INVENTION

The present invention relates to pumps and pertains particularly to an improved fuel delivery pump system for aircraft engines.

The safety and reliability of an aircraft depends on the reliability of its components. The engine is one component whose reliability is most critical. The reliability of the engine depends upon the reliability of its components.

Fuel is delivered to the engines of an aircraft by a fuel pump system, including a pump driven by a motor coupled thereto and controlled by an electronic control system that is usually remote from the motor. The hardware for the typical fuel pump system weighs about fourteen (14) pounds.

An engine must be supplied fuel reliably on demand under varying and hostile conditions. Many engines, particularly the jet engine, depend on a fuel pump for supplying and metering fuel thereto. The pump must be efficient and highly reliable. One area of potential failure in the pump is the seals. This potential problem can be minimized by reducing and/or eliminating seals. One approach to reducing seals is to use an external drive with a magnetic coupling. While this eliminates seals, it also reduces efficiency and reliability of the pump unit.

It is therefore desirable that a compact reliable and efficient pump system be available.

SUMMARY AND OBJECTS OF THE INVENTION

It is the primary object of the present invention to provide an improved pump system for fuel delivery and metering.

In accordance with a primary aspect of the present invention, a pump system comprises a fluid flow passage including a combination housing extending from and communicating from an inlet to an outlet, said flow passage including a heat sink section comprising an elongated conduit in heat transfer contact with a mounting plate for electronics controls for absorbing heat therefrom, a pump section defined by an eccentric rotor positive displacement pump having an inlet and an outlet, and a motor section including a brushless D.C. motor coaxially disposed and directly coupled to said eccentric pump, said motor having a tubular rotor disposed coaxially within said flow passage.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figure 1:
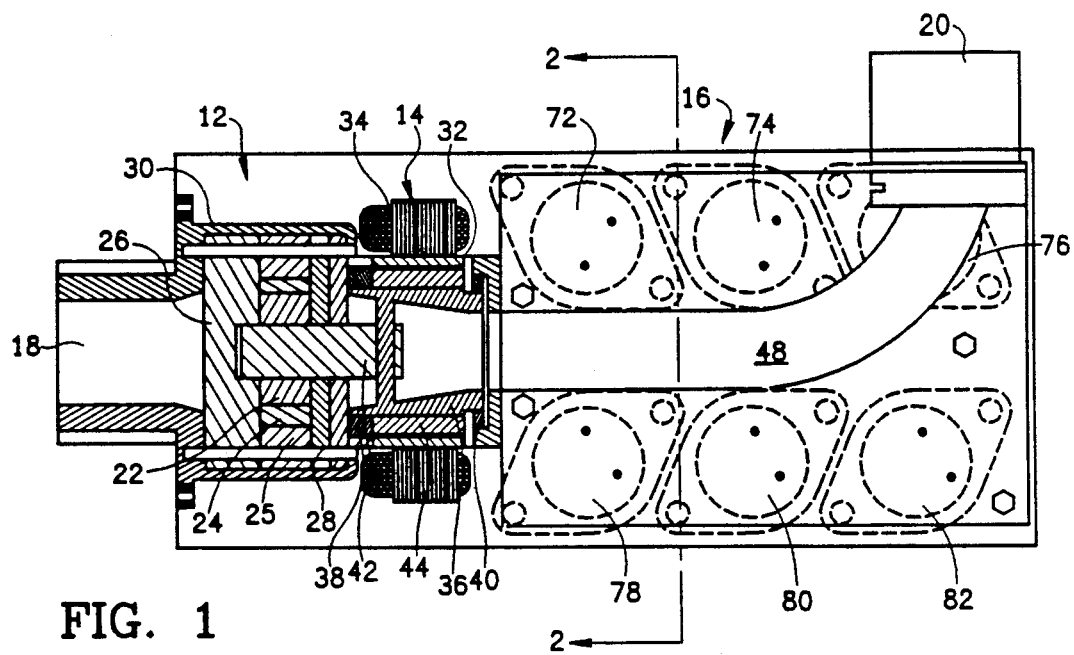
FIG. 1 is a top plan view partially in section illustrating a preferred embodiment of the invention.

Referring to the drawings, and particularly to FIG. 1, there is illustrated a compact integrated pump system or unit in accordance with the invention wherein the pump, motor and electronic controls are all embodied into one compact package. The system, designated generally by the numeral 10, comprises a pump section 12 adjacent to and driven by a motor section 14, and a combination electronics and heat sink section 16. These are all disposed in a conduit or fluid passage in line between an inlet port 18 and an outlet port 20. This pump unit or system is constructed and packaged in a unitary package to be embodied into a single housing, not illustrated, for use such as a fuel delivery and metering system for aircraft engines, e.g. as jet engines. While the system was conceived and developed primarily for a fuel system for aircraft, it may be used for other fluid delivery systems.

The pump system is formed of or forms a fluid flow passage between the inlet port and the outlet port formed by the housing and are components of the pump and motor and a conduit through the heat sink section. The pump 12 is preferably of the type available from the Eaton Corporation under the name or mark GEROTOR, and comprises a rotor including an inner star gear 22 mounted within and rotating with a ring 24. The ring 24 is mounted within a stationary eccentric ring 25. The rotor chamber is formed between a pair of graphite wear plates 26 and 28. The pump is housed within a stainless steel housing 30, which is sealingly connected to the inlet port on one end and is sealingly connected by a welding or the like to housing 32 of the adjacent brushless D.C. motor 14. The housing 32 of the motor is preferably of a graphite impregnated carbon steel. The motor 14 is a brushless type D.C. motor having an external stator winding 34 on the outside of a stationary housing within which is rotatably mounted a tubular rotor 36. The rotor 36 is rotatably mounted in bearings 38 and 40 of graphite. The rotor 36 is drivingly coupled by means of a drive shaft 42 to the pump rotor 22. The motor rotor is located within the fuel passage and is separated from the stator and the controlled electronics by the fuel tube wall. The wall thickness determines the motor air gap. The rotor utilizes high grade Samarium Cobalt magnets with temperature stability above one-hundred eighty degrees Centigrade. Alternatively, other rare earth magnets could be used such as Neodimium Iron Boron magnets.

The motor stator is comprised of class H material, allowing the motor windings to tolerate temperatures of one-hundred eighty degrees Centigrade. The lamination and winding design combine to minimize copper and iron losses to produce a very efficient motor. The rotor utilizes a plurality (eight) of elongated bar magnets 44 spaced around the outside of the rotor. The motor is an eight pole brushless D.C. motor. The stator is sinusoidally wound, and thereby produces very little cogging torque. These attributes combined with the GEROTOR pump produce a design with extremely low output flow ripple. The rotor is made of high grade neodynium-iron-boron magnets with good temperature stability. The motor utilizes graphite bearings to handle thrust loads and provide long, maintenance free life. The rotor is formed of an internal conical or converging passage 46 through which the fluid flows. A fluid flow conduit 48 is secured, such as by welding, to the end of the motor housing 32. The conduit 48 connects and continues the fluid path to the outlet port 20. The fluid flow through the motor helps cool it. The integral connection of the housings and conduits eliminates the need for seals and provides a high pressure system. The materials used provide a system with long shelf life and long useful life.

Figure 2:
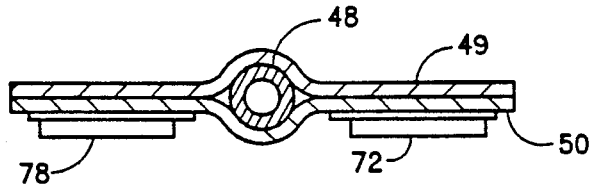
FIG. 2 is a section view taken on line 2—2 of FIG. 1.

The conduit 48, together with one or more heat conductive plates 49 and 50 form a heat sink on which the electronics are mounted, as shown in FIG. 2. This forms a heat sink for cooling the electronics which also generates heat that is utilized for heating fuel flowing through the conduit. The conduit 48 and the plate or plates 49 and 50 are preferably formed of stainless steel, and are formed and bonded into complete heat transfer relation. For example, the plates 49 and 50 are formed with a semi-circular channel, within which the conduit 48 is positioned and bonded by a thermally conductive epoxy or the like, and the plates clamped together therearound, as shown in FIG. 2. The electronics include a plurality of power transistors 72, 74, 76, 78, 80 and 82 which are mounted on the plate 50 in heat conducting relation thereto. The above describes the basic mechanical structure of the pump system.

Figure 3:
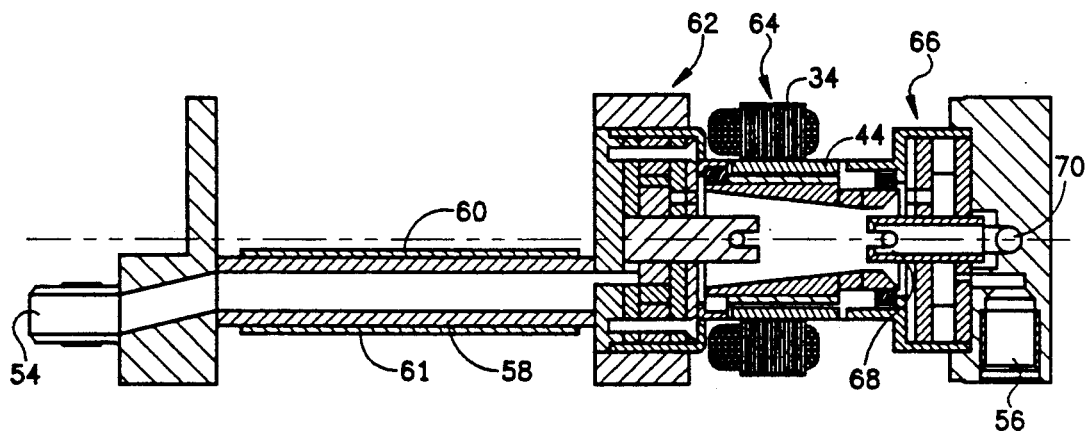
FIG. 3 is a side elevation view, partially in section, illustrating an alternate embodiment of the invention.

Referring now to FIG. 3, an alternate embodiment of the system is illustrated wherein the system is provided with a booster pump, as well as a vapor separator. In this embodiment, an inlet port 54 connects through the combination of components, as previously described, plus an additional pump to an outlet port 56. The fuel or fluid passage includes in this embodiment a fuel tube 58 and heat sink plates 60 and 61 for mounting the electronics as in the previous embodiment. The fuel or fluid tube or conduit 58 communicates with the inlet of a first stage or booster pump, designated generally by the numeral 62, of substantially the same construction as previously described in relation to the FIG. 1 embodiment.

This pump system is driven by a motor of the brushless D.C. type 64, as described in the previous embodiment. The system, however, is provided with a second stage pump 66, substantially identical to the previously described pump, driven by means of a hollow shaft 68 forming a pitot tube inlet to a vapor port or outlet 70. The vapor separator is designed to take advantage of inherent structure of the brushless motor rotor lying between the two pump stages. The fluid exits the boost stage with a tangential velocity with respect to the flow axis. This velocity is maintained within the area between the pump stages by the brushless rotor.

At the minimum flow requirement, the speed of the rotor will be approximately four-hundred rpm, with full flow speed being approximately sixty-six hundred rpm. The centrifugal force exerted on the fluid is proportional to the mass, the square of the tangential velocity, and inversely proportional to the radius. Therefore, the differences in density between the liquid fuel and the vapor cause the different components to separate in the chamber between the stages. The denser liquid moves to the outlet limits of the rotor, and the vapor is forced inward toward the center of the cavity to flow out along the pitot tube. The denser liquid fuel flows into metering pump inlet. The periphery of the rotor cavity contains the dense fuel which flows to the inlet of the pump. The hollow drive shaft is located in the center of the cavity, and provides a passage for the less dense vapor and fuel to be returned to the fuel tank.

Figure 4:
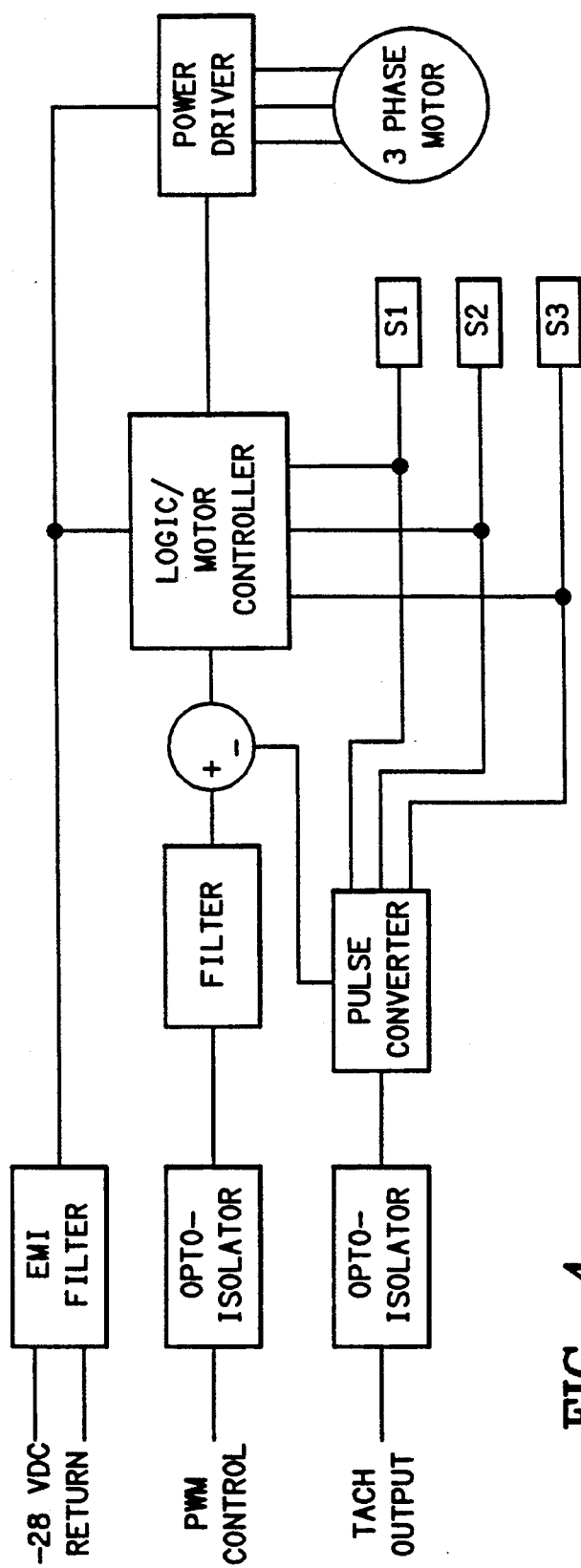
FIG. 4 is a functional block diagram of the control system of the invention.

Referring to FIG. 4, a functional block diagram is illustrated, and the functional blocks thereof conveniently labelled. These include the EMI filter between the twenty-eight volt D.C. source and the power drivers for the D.C. motor. The pulse width modulation (PWM) control is connected through an opto isolator and filter to the logic motor controller. The tachometer output is connected through the opto isolator pulse converter to the logic motor controller to energize the motor windings.

Figure 5:
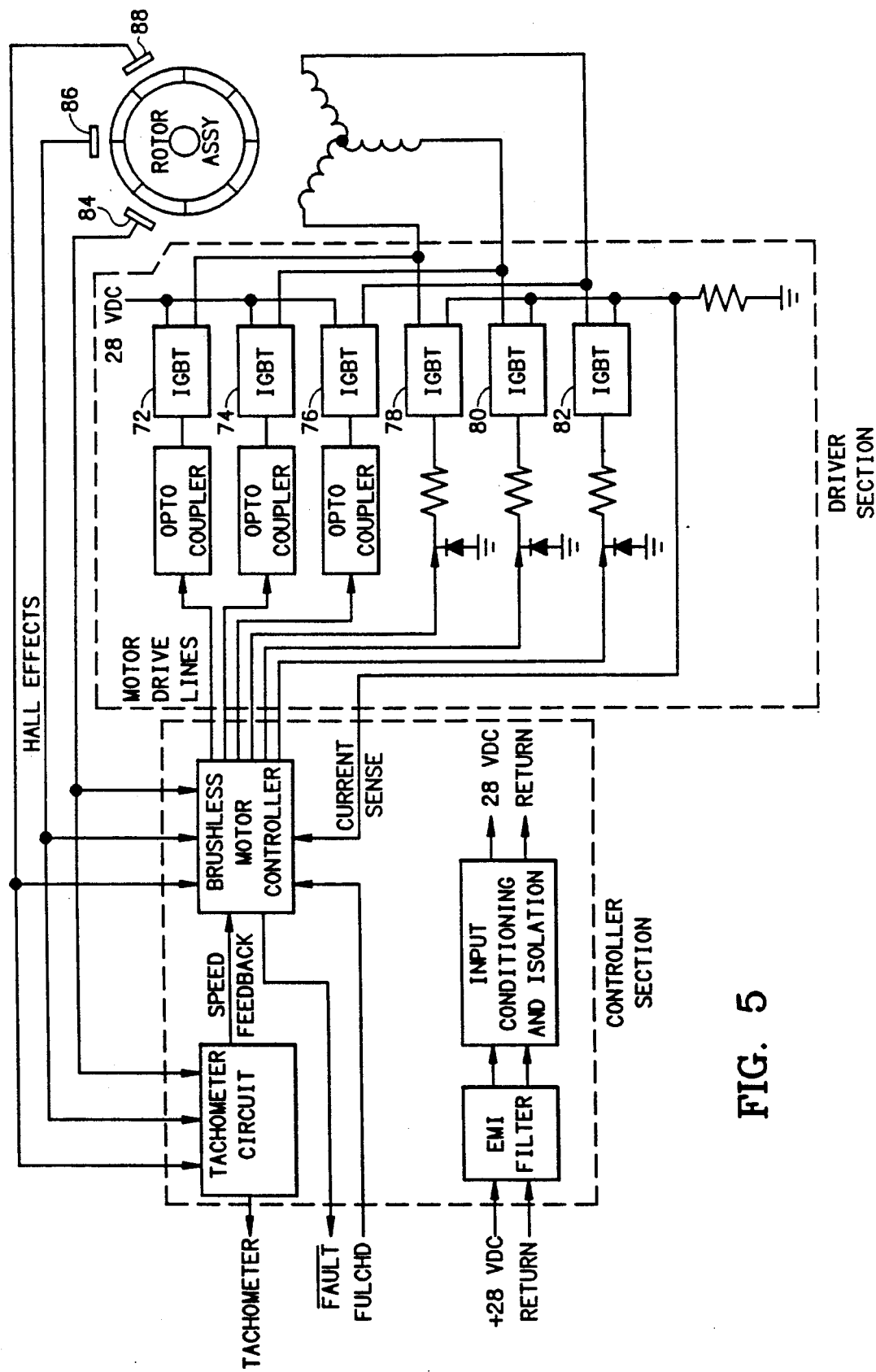
FIG. 5 is a schematic diagram of the control electronics of the invention.

Referring to FIG. 5, a schematic electronic control diagram is illustrated and labelled. The electronics comprises a controller section, including the EMI filter and input conditioning isolation, for the power, a tachometer circuit and a brushless motor controller. The driver section includes the power drivers, which are insulated gate bipolar transistors (IGBT). These power devices have the advantage of high input impedance and fast switching times normally associated with MOSFET technology, while having the efficient output characteristics of a bipolar transistor. This allows for smaller more cost effective devices to be incorporated in the drive.

The drive electronics are conventional and based on a velocity feedback loop to deliver a calibrated fuel rate in response to a 1.6 to 9.5 volt D.C. command signal. The rotor position sensing required for accurate commutation is provided by three Hall effect devices 84, 86, 88 located at the wall of the fuel tube in close proximity to the rotor. The Hall effect devices latch their outputs high or low in response to the change in magnetic field as the rotor magnetic poles pass each Hall effect position. The Hall effect outputs are provided to both the motor controller and the tachometer circuits.

The tachometer senses the hall effect transitions and provides a D.C. voltage output that is proportional to the speed of the rotor and therefore to the speed of the pumps.

The control electronics includes a microprocessor, which will be programmed to set the pump speed based on several parameters, including speed, combustion, temperature, pressure, etc.

While we have illustrated and described our invention by means of specific embodiments, it is to be understood that numerous changes and modifications may be made therein without departing from the spirit and scope of the invention as defined in the appended claims.

We claim:

1. An integral fluid pump delivery and metering system comprising in combination:

a combination pump and motor housing and elongated conduit defining a flow passage extending from and communicating from an inlet to an outlet, said flow passage including a heat sink section comprising said elongated conduit in heat transfer contact with a mounting plate for electronics controls for absorbing heat therefrom, a pump section defined by an eccentric rotor positive displacement pump having an inlet and an outlet, and a motor section including a brushless D.C. motor coaxially disposed and directly coupled to said eccentric pump, said motor having a tubular rotor disposed coaxially within said flow passage; and electronics means for controllably driving said motor mounted on said heat sink means for transferring heat from said electronics to said fluid.

2. An integrated fluid pump system according to claim 1 wherein said tubular rotor includes a converging conical in coaxial alignment with and forming a part of said flow passage.

3. An integral fluid pump system according to claim 2 wherein said pump housing, said motor housing and said elongated conduit are constructed of stainless steel integrally connected for forming a continuous conduit.

4. An integrated fluid pump system according to claim 3 wherein said pump has an inner housing that is constructed of graphite impregnated carbon.

5. An integral fluid pump system according to claim 4 wherein said motor is eight pole, having eight elongated rare earth magnets mounted in spaced relation around an outer surface of the rotor thereof.

6. An integral fluid pump system according to claim 5 wherein said pump and said motor having graphite bearings exclusively.

7. An integral fluid pump system according to claim 6 wherein said pump section comprises a first positive displacement pump and a second positive displacement pump disposed on opposite ends of said motor.

8. An integral fluid pump system according to claim 7 wherein said second positive displacement pump comprises a vapor separator including a hollow drive shaft for communicating vapor to a vapor port.

9. An integral fluid pump system according to claim 8 wherein said electronic means comprises a plurality of insulated gate bipolar transistors and a velocity feedback loop.

10. An integral fluid pump delivery and metering system comprising in combination:
   pump means comprising a positive displacement pump including a pump housing having an inlet and an outlet and an impeller therein;
   motor means comprising a brushless D.C. electric motor including a motor housing integral with and forming an extension of said pump housing and in fluid flow communication with said inlet and outlet, a rotor within said housing, and a stator on the exterior of said housing;
   heat sink means comprising an elongated conduit in fluid flow communication with said inlet and outlet and in heat transfer contact with a mounting plate for electronic means for power and control of said motor; and
   electronic means for power and control of said motor mounted on said mounting plate for absorbing heat therefrom.

11. An integral fluid pump system according to claim 10 wherein said heat sink means is disposed up stream of said inlet and said electronic means is in heat transfer contact therewith.

12. An integral fluid pump system according to claim 10 wherein said heat sink means is disposed down stream of said outlet and said electronic means is in heat transfer contact therewith.

13. An integral fluid pump system according to claim 10 wherein said rotor is tubular and in coaxial alignment with and forming a part of a flow passage therein.

14. An integral fluid pump system according to claim 10 wherein said pump has an inner housing that is constructed of graphite impregnated carbon.

15. An integral fluid pump system according to claim 10 wherein said pump housing, said motor housing and said elongated conduit are constructed of stainless steel integrally connected for forming a continuous conduit.

16. An integral fluid pump system according to claim 15 wherein said rotor is tubular and in coaxial alignment with and forming a part of a flow passage therein.

17. An integral fluid pump system according to claim 16 wherein said pump has an inner housing that is constructed of graphite impregnated carbon.

18. An integral fluid pump system according to claim 17 wherein said motor is eight pole, having eight elongated rare earth magnets mounted in spaced relation around an outer surface thereof.

19. An integral fluid pump system according to claim 18 wherein said pump and said motor having graphite bearings exclusively.

20. An integral fluid pump system according to claim 10 wherein said pump means comprises a first positive displacement pump and a second positive displacement pump each including a pump housing having an inlet and an outlet and an impeller therein and disposed on opposite ends of said motor.

21. An integral fluid pump system according to claim 20 wherein said second pump comprises a vapor separator including a hollow drive shaft for communicating vapor to a vapor port.

22. An integral fluid pump delivery and metering system comprising in combination:
   pump means comprising a positive displacement pump including a stainless steel outer pump housing and a graphite impregnated inner housing having an inlet and an outlet and a positive displacement eccentric rotor therein;
   motor means comprising a brushless D.C. electric motor including a stainless steel motor housing integral with and forming an extension of said pump housing and in fluid flow communication with one of said inlet and outlet, a hollow rotor having a converging conical throughbore mounted for rotation on graphite bearings within said housing, and a wound stator on the exterior of said housing;
   heat sink means comprising an elongated stainless conduit integral with and forming an extension of one of said pump housing and said motor housing in fluid flow communication with one of said inlet and outlet and in heat transfer contact with a mounting plate for electronic means for power and control of said motor; and
   electronic means comprising a plurality of insulated gate bipolar transistors and a velocity feedback loop for power and control of said motor mounted on said mounting plate for absorbing heat therefrom.

23. An integral fluid pump system according to claim 22 wherein said motor is eight pole, having eight elongated, rare earth magnets mounted in spaced relation around an outer surface of the rotor thereof.

* * * * *